US006934783B2

(12) United States Patent
Müller et al.

(10) Patent No.: US 6,934,783 B2
(45) Date of Patent: Aug. 23, 2005

(54) METHOD FOR THE SCHEDULED EXECUTION OF A TARGET FUNCTION

(75) Inventors: Stefan Klemens Müller, Illingen (DE); Clemens Bierwisch, Aachen (DE); Rudolf Nacken, Linnich (DE); Ulrich Dieterle, Oberwoltach (DE)

(73) Assignee: National Instruments Corporation, Austin, TX (US)

( * ) Notice: Subject to any disclaimer, the term of this patent is extended or adjusted under 35 U.S.C. 154(b) by 443 days.

(21) Appl. No.: 09/921,278

(22) Filed: Aug. 2, 2001

(65) Prior Publication Data

US 2002/0069233 A1 Jun. 6, 2002

(30) Foreign Application Priority Data

Aug. 11, 2000 (DE) ........................................ 100 39 277

(51) Int. Cl.[7] ................................................ G06F 13/24
(52) U.S. Cl. ...................................................... 710/260
(58) Field of Search .......................... 710/47, 109, 266, 710/260–261, 269; 713/501, 502

(56) References Cited

U.S. PATENT DOCUMENTS

| | | | | |
|---|---|---|---|---|
| 5,404,536 A | * | 4/1995 | Ramakrishnan et al. | 710/220 |
| 5,613,129 A | | 3/1997 | Walsh | |
| 5,654,905 A | | 8/1997 | Mulholland et al. | |
| 5,694,604 A | * | 12/1997 | Reiffin | 718/107 |
| 5,701,446 A | | 12/1997 | Abali et al. | |
| 5,768,572 A | | 6/1998 | George et al. | |
| 5,944,840 A | | 8/1999 | Lever | |
| 6,105,102 A | * | 8/2000 | Williams et al. | 710/261 |
| 6,326,882 B1 | * | 12/2001 | Chiu et al. | 340/309.9 |
| 6,401,222 B1 | * | 6/2002 | Adams | 714/42 |
| 6,618,779 B1 | * | 9/2003 | Branch | 710/261 |
| 6,697,973 B1 | * | 2/2004 | Baumeister et al. | 714/55 |
| 6,738,849 B2 | * | 5/2004 | Morgan et al. | 710/264 |

OTHER PUBLICATIONS

Chih–Hao Tsai; "PCTIMER: Millisecond Resolution Timing with DJGPP V2 and DPMI"; Version 1.4 Release Notes, Published Oct. 15, 1999; Accessed from http://www.geocities.com/hao510/pctimer, Mar. 9, 2004.*

* cited by examiner

*Primary Examiner*—Glenn A. Auve
*Assistant Examiner*—Nimesh Patel
(74) *Attorney, Agent, or Firm*—Meyertons Hood Kivlin Kowert & Goetzel, P.C.; Jeffrey C. Hood

(57) ABSTRACT

A method for the scheduled execution of program steps (target function) by the processor of a computer at predetermined times, in which a register of the computer is read repeatedly and this value is compared with a reference value representing the predetermined time, wherein when the read value corresponds to the reference value, the target function is executed in the processor. In the described method, a technique is used that is known by the English term "polling." The disadvantage of the polling method is that it is not suitable for multitasking. This disadvantage is overcome by the present invention. This task is solved such that the reading of the register is performed within a start function that is executed by the processor as an interrupt service routine.

45 Claims, 4 Drawing Sheets

METHOD FOR THE SCHEDULED EXECUTION OF A TARGET FUNCTION

FIELD OF THE INVENTION

The invention pertains to a method for the scheduled execution of program steps by means of the processor of a computer at predetermined times, wherein a register of the computer is read repeatedly and its value is compared with a reference value representing the predetermined time. When the read value corresponds to the reference value, the aforementioned program steps are executed by the processor. The sequence of scheduled program steps is designated as a "target function" in the following.

DESCRIPTION OF THE RELATED ART

In the aforementioned method, a technique is used that is known by the term "polling." In polling, the value of a register of a computer is continuously compared with a predetermined value and when the predetermined value is reached, a certain target function is called. The count value of computer registers that are incremented or decrement at a uniform clock rate by a quartz oscillator always corresponds to a concrete time value. Such registers are designated count registers. Thus, by presetting the count value of the count register, the time of the function execution can be predetermined exactly. In particular, by the use of the count register that is incremented or decremented at a high clock rate, the time can be specified with very high precision. As a rule, the highest clock rate within a computer is the processor clock rate. In modem processors, a count register is incremented for every clock cycle of the processor (thus at the processor clock rate). This register is called time stamp counter (in short: TSC) and can be read by a software program and thus the current time can be specified with high resolution. If the processor clock rate is known (e.g. 100 MHz), then from every TSC difference (e.g. 100,000), a time difference can be calculated (e.g. 1 ms).

The disadvantage of the polling method is that it is not capable of multitasking, i.e., it cannot be executed simultaneously with one or more other programs on the same processor without detriment to the time precision. Pure polling with the highest resolution requires the total computing power of the processor and leaves no computing time available for other programs.

The object of the invention is to provide the method mentioned in the introduction with the capability of multitasking.

SUMMARY OF THE INVENTION

This object is achieved according to the invention in that the reading of a count register is performed within a start function which is executed by the processor as an interrupt-service routine, wherein, preferably, the interrupt signal is triggered before the predetermined time with a lead time and wherein the lead time is fixed so that it is greater than the maximum expected delay between the appearance of the interrupt signal at the interrupt input of the processor and the interrupt call, i.e. the execution of the start function.

The method according to the invention combines the polling described in the introduction with a second known method for the discrete-time call of a defined function, namely the interrupt request. An interrupt request enables, other than the described polling, a lower precision in observing the predetermined schedule. As a rule, a processor has various interrupt inputs that have different priorities. According to the priority of the used interrupt input, a shorter or longer delay may be generated between the appearance of the interrupt signal and the actual execution of the sequence of program steps allocated to the respective interrupt input, the so-called interrupt-service routine (ISR). Additional factors that may influence the delay between the appearance of the interrupt signal and the execution of the ISR include the current load on the processor by other tasks running on the processor that temporarily deactivate the interrupt handling of the processor. Finally, interrupt requests are executed with lower time resolution. So-called timer interrupts that supply the interrupt signal from a timer of the computer to the interrupt input of the processor have a frequency, for example, that must be inferior to the processor clock rate by a factor of more than 100, because a meaningful ISR includes at least 100 processor commands and thus requires at least 100 processor clock cycles for execution.

Because an interrupt request interrupts all the programs running on the processor for only a short time for the execution of the interrupt service routine, it is very well suited for performing discrete-time function calls in a multitasking system. However, the exactness of polling is not achievable by using an interrupt request. On these grounds, an interrupt request is combined, according to the invention, with a conventional polling method. During the runtime of the computer, a value for the maximum delay between the appearance of the interrupt signal at the interrupt input of the processor and the execution of the start function is determined or estimated. The repeated reading of the count register and the comparison of the read value with the reference value (polling method) are performed by an interrupt request at least this maximum delay time value before the predetermined time.

By the interrupt signal that was triggered early enough to assure that the interrupt request of the start function is executed before the predetermined time, it is guaranteed that the polling method is running in the processor when the predetermined time is reached and the desired program steps of the target function are processed. The call of the target function ends the polling and after executing the target function the processor can turn to the processing of other tasks until the start function is executed again within a new interrupt request in order to call the target function at a new predetermined time.

In order to avoid interruptions during the polling, it is preferably guaranteed that the interrupt handling of the processor is turned off during the runtime of the start function.

As already explained, the time stamp counter of the central processor (CPU) is used for polling with optimum time resolution. The interrupt signal is preferably caused by a timer interrupt that is triggered by a quartz-oscillator-clocked timer of the computer.

Because the maximum expected delay between the appearance of the interrupt signal at the interrupt input and the resulting interrupt request of the start function varies, it is important to determine this maximum delay continuously during the runtime of the computer. The assumption of a delay that is too large would cause, on the statistical average, an unnecessarily long time to be spent with the polling method.

The time-dependent value for the expected maximum delay is preferably determined on the basis of the actual delay. The actual delay can be determined by reading the time stamp counter at the beginning of the start function and by subtracting the value (in units of the count register) corresponding to the appearance of the interrupt signal. This measured actual delay should be multiplied by a safety factor that is between 1.2 and 2. However, an upper limit should be set for the maximum delay and thus for the lead time of the interrupt signal. If the delay between the interrupt signal and the execution of the start function is too long, the interrupt request is regularly initiated too early by the method according to the invention. This results in a long runtime of the polling method before the target function is executed. Little computing time remains for other tasks of the multitasking system. This can lock up the operating system. The initial value for the lead time should be determined within a test run in order to keep the possibility of calls of the target function that are too late as low as possible. No call of the target function occurs within the test run, only the actual delay is determined in order to define its maximum value. During the test run, 10–100 calls of the start function should be performed.

Because interrupt inputs are largely reserved for defined functions in modem computers, particularly personal computers, with a plurality of internal and external peripheral devices, it is unlikely that there is an individual, separate interrupt input available for the execution of the method according to the invention. In addition, the interrupt request preferably occurs at discrete times. For this reason, a timer interrupt is used, i.e., an interrupt signal that is triggered by a timer of the computer. The timer interrupt of a personal computer, as a rule, is used by its operating system for various functions. This applies in particular to the timer interrupt with the highest priority (IRQ 0) that controls the internal clock and the processor time slicing for various programs (task scheduler) in IBM compatible PCs of the x86 family, among others. The use of the highest priority timer interrupt has the advantage that the maximum delay has the smallest value.

Thus a timer interrupt is preferably used for the call of the start function, wherein this timer interrupt is shared with at least one other simultaneously running program on the computer; in particular, it is shared with the operating system. The operating system expects the execution of a certain individual interrupt service routine when the mentioned timer interrupt is triggered. This service routine associated with the shared timer interrupt is referred to as the “original function” in the following. In order to execute the start function instead of the original function initially called by the timer interrupt, the address of the original function is read from the interrupt table that contains the addresses of the service routines associated with the various interrupt inputs and the address of the original function is replaced by the address of the start function.

The trigger rate of IRQ 0 can be changed in modem multitasking operating systems by reprogramming the appropriate timer. Unexpected reprogramming of the timer would mean severe disturbance to the method according to the invention, because it would change the interval between two interrupt requests. It would be possible that an interrupt request for the beginning of the polling method could happen after the moment when the target function should have been executed. For this reason it is important to exclude adjustments to the clock rate of the used timer interrupt. This can be achieved by requesting the maximum interrupt clock rate from the operating system. For this purpose the API of the operating system generally offers certain functions (e.g. multimedia functions) with respect to the timer interrupt IRQ 0. When calling the start function and during the execution of the method according to the invention, the set clock rate does not have to be maintained. The clock rate can be adjusted arbitrarily by the program modules executing the method if it is reset to the set maximum clock rate before the end of the method.

If the maximum clock rate for the timer interrupt is fixed, it is required that the interrupt service routine (original function) be executed with every call of this timer interrupt, since the operating system expects its execution. The method according to the invention works optimally by reprogramming the timer. With reprogramming, however, it is preferably still guaranteed that the original function is called at the times set by the operating system through the programming of the timer. Thus, the computer program according to one embodiment of the invention supplies a list with the predetermined times for the execution of the target function and a list with the times for the execution of the original function. The method according to the invention processes both lists simultaneously. The polling and the selection of the time of the interrupt signal by suitable programming of the timer can be used for both calling the target function and calling the original function. When a predetermined time arrives, it is decided, with reference to the lists supplying the corresponding times, whether the target function or the original function should be activated. If identical times are provided on both lists, then when such a time arrives, the target function and the original function are activated one immediately after the other.

The operating system expects certain register contents in the processor register at the end of the original function executed by the timer interrupt IRQ 0. For this reason, the register contents of the processor register are preferably stored at the beginning of the start function that is unknown the operating system and then written back into the processor register at the end of the start function. By means of PUSH commands, the register contents at the beginning of the start function are pushed onto the stack of the computer. Reading the contents back into the processor register is achieved by means of POP commands.

The interrupt controller monitors each of the currently executed interrupts. With the aid of the interrupt controller, it can be determined whether the corresponding interrupt request IRQ 0 was generated by the timer (hardware interrupt) or by the operating system (software interrupt), which occasionally executes this interrupt request itself from the interrupt service routine. In order to distinguish between hardware and software interrupts the currently executed interrupt at the beginning of the start function is determined by reading a register of the interrupt controller and then the processing of the current interrupt request is acknowledged by an end-of-interrupt command (EOI). If the start function determines by means of the register content of the interrupt controller that IRQ 0 is currently executed, then it is recognized that it is a hardware interrupt. If the processing of another interrupt request is determined, because the processing of IRQ 0 is deemed to be finished due to the EOI command of the start function, it is recognized that it is a software interrupt. In this case, the start function will activate the program steps expected by the operating system.

While the target function is activated by a so-called function call, wherein the start function is returned to after execution of all the program steps, the original function is activated by a JUMP command so that at the end of the execution of the original function there is no return to the jump point. Thus, it is guaranteed that the operating system does not recognize any references at the end of the execution of the original function that the original function was not immediately activated by the interrupt request but by the start function.

In order to prevent interruptions of the start function and functions called by the start function, it is preferably guaranteed that the interrupt handling of the processor is deactivated during the runtime of the start function. This prevents the operating system from being disturbed by the execution of the start function due to an interruption of the start function at an invalid point. Finally, the start function has the task of determining runtime conflicts during its own execution. For example, during the execution of the start function, the next timer interrupt can already be waiting. Also, the runtime of the functions (target functions and/or original functions) activated by the start function can be so long that at the end of these functions, the next predetermined time for the execution of the target function may have already arrived. Ultimately, too little time can remain between the interrupt request of the method according to the invention in order to run the operating system and the programs it is executing in a stable manner. All of these errors can be tested for by the start function and reported to the target function. A response to these error reports can be chosen on a case to case basis, i.e., depending on the program steps of the target function as well as their importance. For example, the execution of the target function can be canceled and these actions can be registered in an error protocol when the execution of the target function has no major importance. If the execution of the target function at a defined time period is of paramount importance, then all other program steps of the computer can be temporarily interrupted. During this period, the operating system of the computer and the programs executed by it become extremely sluggish and are brought temporarily to a standstill.

BRIEF DESCRIPTION OF THE DRAWINGS

In the following, embodiments of the invention will be explained with reference to the attached drawings. The drawings show FIG. 1, a process flow diagram for the execution of an embodiment of the method according to the invention when the timer is not shared and when it is freely programmable, FIG. 2, a schematic for the execution of an embodiment of the method according to the invention that shares a timer used by another program, FIG. 3, a process flow diagram for the execution according to FIG. 2 when the shared timer is freely programmable, and FIG. 4, a process flow diagram for the execution according to FIG. 2 when the shared timer has a fixed clock rate.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Figure 1:
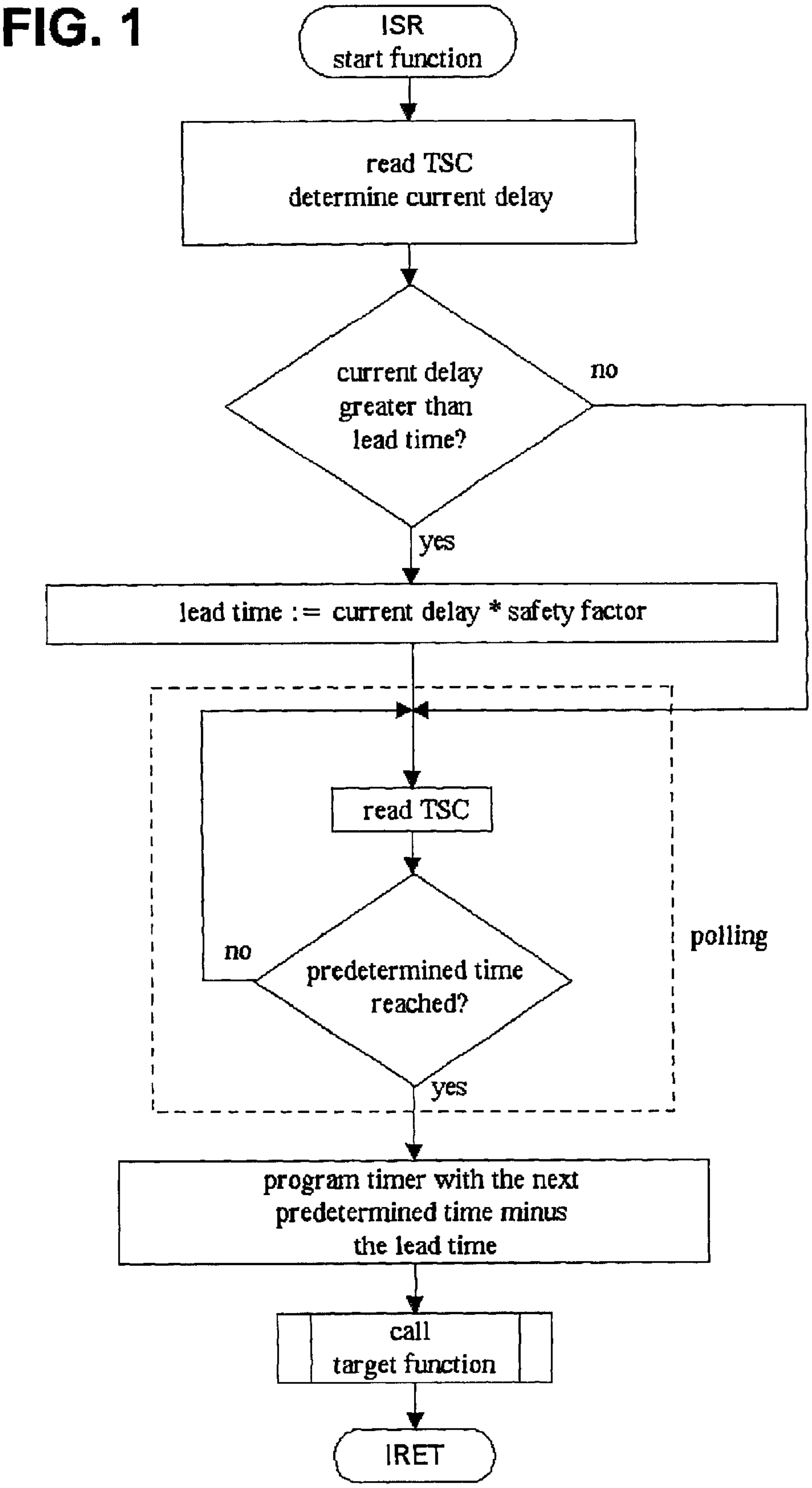

FIG. 1 shows the principal execution flow of a program using the method according to the invention. As the interrupt service routine, the mentioned start function is called by an interrupt request. This reads the time stamp counter (TSC) and compares the time determined using this value with the time of the interrupt signal. The time difference represents the current delay. If the current delay is longer than the set value of the lead time of the interrupt signal, then the value for the lead time is preferably set to at least the measured current delay. Preferably, a safety factor of 1.2 to 2 is taken into account so that the lead time is longer than the measured current delay.

Next, the program executes a polling method that continuously reads the TSC and compares the read value with the value representing the predetermined time for the execution of the target function. When the read value corresponds to this reference value, the target function is called. Then the timer is programmed at the next predetermined time minus the lead time so that the polling method is executed again in due time before the next predetermined time by means of the start function.

Figure 2:
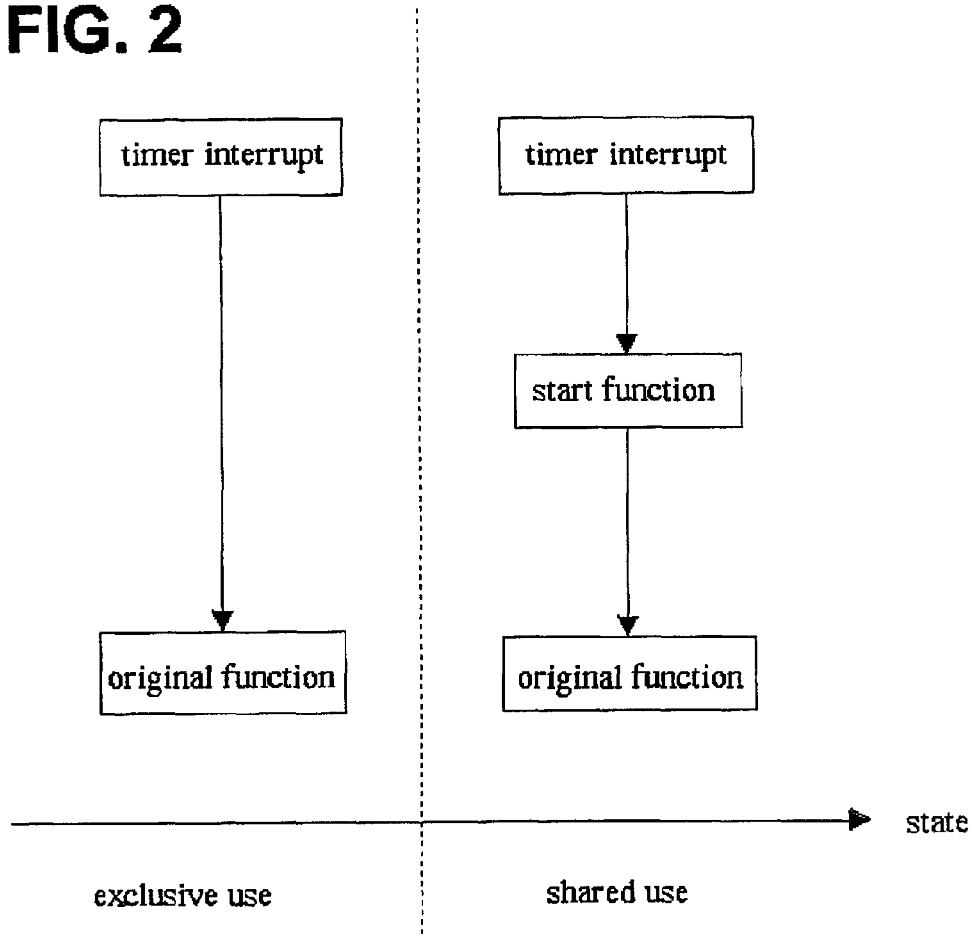

As can be seen in FIG. 2, the method according to the invention can be executed by use of a timer, which was initially provided exclusively for the execution of a certain interrupt service routine (original function) of the operating system. The exclusive use by the operating system is shown in the left half of FIG. 2. By executing the method according to the invention, the start function is inserted as an interrupt service routine activated by the timer interrupt. The address of the original function is read from the interrupt table in the computer memory and replaced with the address of the start function. The start function executes alternatively or—as already explained—in series the target function and/or the original function.

Figure 3:
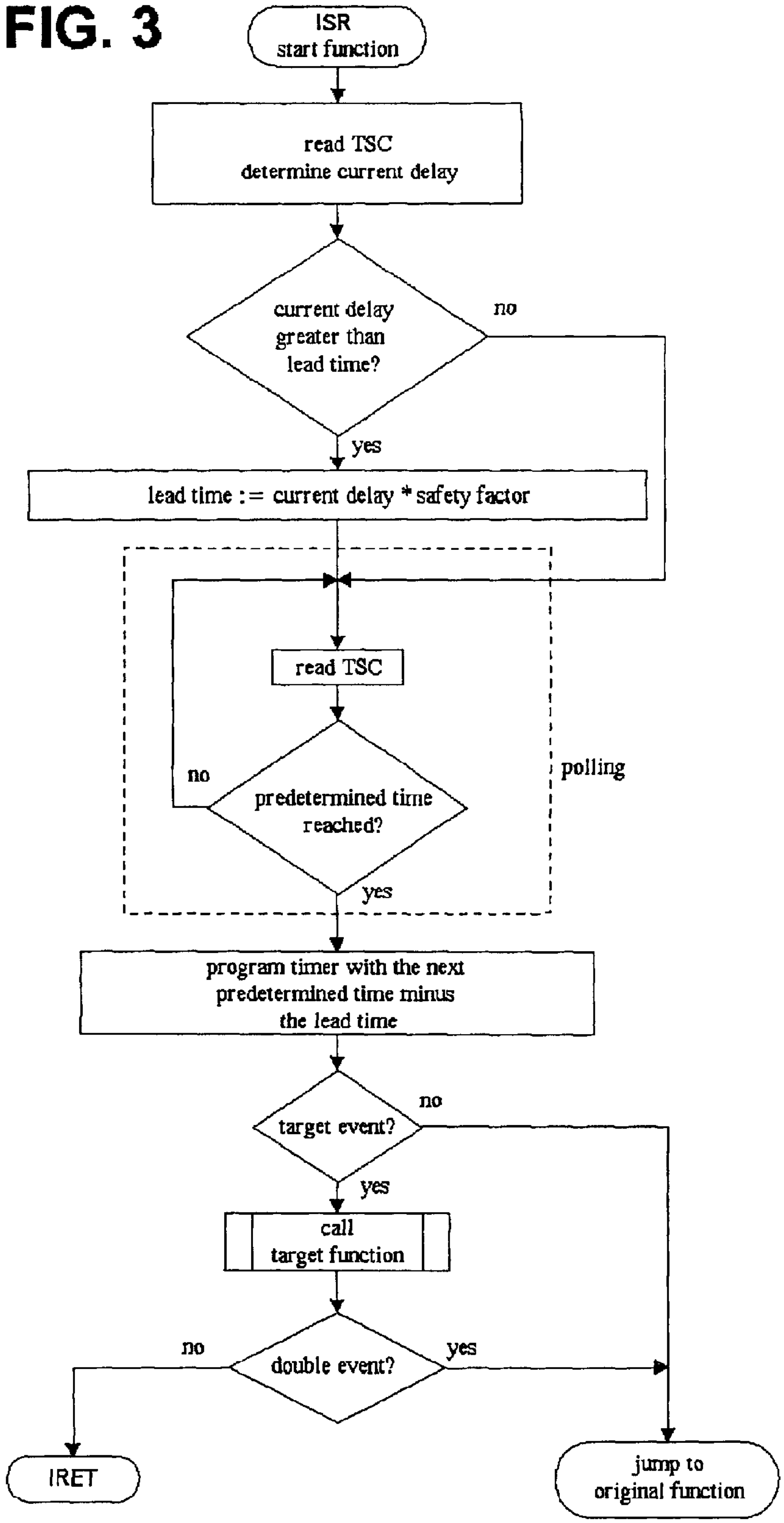

FIG. 3 shows the process flow of the method according to the invention with a shared timer for the case in which the timer is reprogrammable by the start function. In this case, the start function determines whether the original function should be activated (no target event) or whether the target function should be called (target event) at the present time. The program executing the method according to the invention creates a list with the predetermined times for activating the original function and a list with the predetermined times for calling the target function. These lists enable the start function to make the required distinction. The target function is called with a "CALL" command. At the end of the target function there is a return to the start function, which then returns by means of an interrupt return command (IRET) to the program point interrupted by the interrupt. The original function is activated from the start function by means of a JUMP command after storing the contents of the processor register in the manner described above. At the end of the original function, an IRET command occurs automatically.

Figure 4:
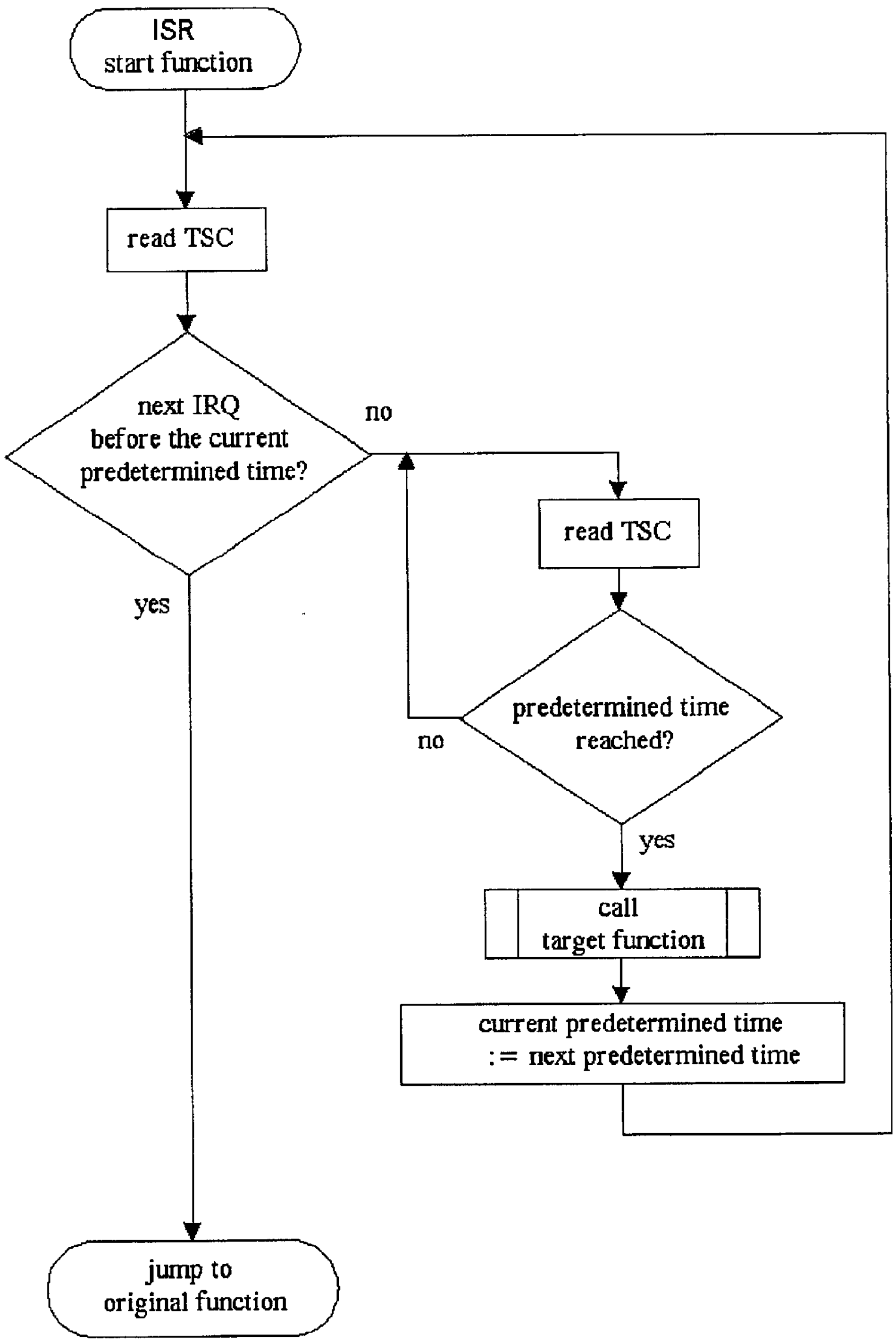

FIG. 4 shows the practical case in which a timer that is clocked with a fixed clock rate and that is shared with the operating system executes the interrupt request. The operating system proceeds in this case with the assumption that every interrupt request is followed by the execution of the original function. Otherwise, the time base of the operating system would not process correctly, which would lead to too fast or too slow advancements of the system clock. Again, the program executing the method according to the invention creates a list of every predetermined time when the target function should be called. At first, the start function reads the time stamp counter and determines whether there is a new interrupt request (IRQ) in a period that corresponds at least to the maximum expected delay before the next predetermined time. If this is the case, the jump to the original function can be executed by the start function, which then returns to the interrupted program execution. If there are no interrupt requests before the next predetermined time, the start function calls the polling loop which consists of reading the time stamp counter and comparing the read value with the value for the predetermined time. When both values correspond, the target function is called and the next predetermined time is taken into processing. Next, it is determined whether there is an interrupt request before the now current predetermined time. If this is not the case, the polling loop is executed again until the target function is called. In this way, polling can be executed multiple times by means of one interrupt request before the jump to the original function occurs.

Finally, the conversion of the method shown according to the invention in FIGS. 1–4 for an IBM compatible personal computer (PC) with an x86 processor will be described. As a software platform, a Microsoft operating system with 32-bit technology (Windows 95/98/Me/NT/2000) is used. This combination of hardware and software platforms is the most common worldwide.

IBM compatible PCs use two cascaded interrupt controllers of the type 8259A that multiplex 15 prioritized IRQs on the INT pin of the x86. The highest priority IRQ is IRQ 0. The output of a timer of the type 8254 is connected to IRQ 0. Thus, IRQ 0 can be used as a timer interrupt. The timer 8254 can be programmed in 65536 frequency steps of 18.206 Hz up to 1.193182 MHz. The time stamp counter (in short: TSC) in x86 chips beginning with the Pentium (registered trademark of INTEL) can be used as the count register which is incremented at the processor clock rate.

The Windows operating system uses the timer 8254 for counting the clock time and for time-slice control of the preemptive multitasking scheduler. According to the requirements for time resolution of each application, the timer 8254 is continuously reprogrammed, but only up to a maximum rate of about 1 kHz. This maximum rate can be forced through the WIN32-API function call "timeBeginPeriod" from the multimedia library. By means of this call, reprogramming of the timer 8254 by the operating system is prevented.

By overwriting the interrupt gate in the IDT at Index 0x50 (Windows 95/98/Me) or Index 0x30 (Windows NT/2000), the original function is replaced by the start function as the new ISR. Under Windows 95/98/Me, one must be careful because many IDTs that are switched between continuously are used. Thus, the interrupt gates in all IDTs are to be overwritten.

The start function as the ISR preferably ensures before the jump to the original function that it will not disrupt the execution of the operating system. At the beginning of the start function, the following register contents are saved onto the stack: EAX, EBX, ECX, EDX, ESP, EBP, ESI, EDI, EFLAGS, DS, ES, FS. Then the direction flag is cleared by the assembler command "cld" in order to always increment, instead of decrement, the index register by string operations. Due to the DOS compatibility of the Windows operating system and the constructed, virtual DOS environment, only the selection of the correct code segment (CS) beginning with the linear address zero (flat code segment) for the execution of the ISR is guaranteed when starting the ISR. DS, ES, and FS can contain values that do not reference flat segments for the execution of the ISR when a virtual DOS environment is interrupted. Thus, DS and ES should be set to a flat data segment (Windows 95/98/Me 0x30, Windows NT/2000 0x10) and FS should be set correspondingly to a flat code segment (Windows 95/98/Me 0x28, Windows NT/2000 0x08). This satisfies the necessary preparations for executing the ISR. Before the original function can be jumped to, the register contents stored on the stack are rewritten into the register. This also concerns the data segment register DS. The address of the original function, however, is stored in a data segment variable that cannot be accessed if the ISR is not called in a flat data segment. In order to bypass this problem, the jump into the original function is addressed by the code segment, because an ISR is always executed in a flat code segment.

Through these measures, it is guaranteed that the start function leaves behind no damaging tracks to the execution of the original function or the operating system.

In addition to hardware interrupts, the x86 processors also use software interrupts. These are triggered by the software itself and are executed by calling the corresponding ISR. The original function uses these software interrupts in that it calls itself multiple times. Because the start function is registered in the IDT instead of itself, the start function is called multiple times without the appearance of a timer interrupt. The start function is preferably able to decide whether it was called from a hardware interrupt or from a software interrupt, because software interrupts are not allowed to activate the polling and the execution of the target function. In case of a software interrupt, the start function only has to jump to the original function. Whether the start function was called from a hardware interrupt or from a software interrupt can be determined by reading a register of the interrupt controller. The interrupt controller 8259A has an in-service register that supplies information on the present interrupt. By reading the in-service register, the start function can determine whether it is dealing with a hardware interrupt or a software interrupt. However, this only works if the hardware interrupt has already been acknowledged by an end-of-interrupt (in short: EOI) command to the interrupt controller 8259A. In order to definitely distinguish between hardware interrupts and software interrupts, the start function preferably immediately transmits a specific EOI command to the interrupt controller 8259A after the evaluation of the in-service register in 8259A, which clears the corresponding bit in the in-service register. This exact bit is read by the start function when it is called by a software interrupt of the original function. In this way, it can definitely distinguish between hardware interrupts and software interrupts.

The start function should also—as described above—recognize interrupt pre-conflicts (at the beginning of the start function the next timer interrupt is already present) and interrupt post-conflicts (at the end of the start function the next timer interrupt is already present). Thus, it may also access the interrupt controller 8259A directly. The interrupt controller 8259A has an interrupt request register that supplies information on which interrupts are "in the queue." If IRQ 0 is already in the queue again at the beginning of the start function, there is an interrupt pre-conflict. Correspondingly, there is an interrupt post-conflict when IRQ 0 is already in the queue again at the end of the start function.

The consequences of a determined interrupt conflict depend on the program steps of the target function. The start function only sends an error report to the target function which then takes the required measures (e.g., interruption of the target function).

Although the system and method of the present invention is described in connection with several embodiments, it is not intended to be limited to the specific forms set forth herein, but on the contrary, it is intended to cover such alternatives, modifications, and equivalents, as can be reasonably included within the spirit and scope of the invention as defined by the appended claims.

We claim:

1. A method for a scheduled execution of a target function by a processor of a computer at predetermined times, wherein the processor comprises a first interrupt input operable to receive a first interrupt signal, the method comprising:

executing a start function, wherein the start function is executed by the processor as a first interrupt service routine, wherein the start function is executed in response to triggering of the first interrupt signal;

the start function repeatedly reading a computer register to obtain a read value;

the start function comparing the read value with a reference value, wherein the reference value corresponds to a predetermined time; and the start function calling the target function when the read value corresponds to the reference value, wherein the start function calling the target function initiates said execution of the target function.

2. The method of claim 1, wherein the first interrupt signal is triggered by a timer, wherein the timer is programmed with the reference value by the start function.

3. The method of claim 1, wherein the first interrupt signal is triggered with a lead time before the predetermined time;

wherein the lead time is greater than an expected maximum delay between appearance of the first interrupt signal at the first interrupt input of the processor and said execution of the start function.

4. The method of claim 1, wherein the computer register comprises a count register.

5. The method of claim 4, wherein the count register comprises a time stamp counter of the processor.

6. The method of claim 1, wherein the first interrupt signal is triggered by a computer timer as a timer interrupt.

7. The method of claim 1, wherein an expected maximum delay is determined continuously.

8. The method of claim 7, wherein the computer register comprises a count register; and wherein the value for the expected maximum delay is determined by using an actual delay, wherein the actual delay is determined by reading the count register at the beginning of the start function and by subtracting the value representing time of appearance of the first interrupt signal.

9. The method of claim 8, wherein the expected maximum delay is determined by multiplying the actual delay by a safety factor.

10. The method of claim 9, further comprising:

setting value of a lead time substantially equal to the expected maximum delay when the expected maximum delay exceeds an upper limit.

11. The method of claim 8, further comprising:

generating an error when the expected maximum delay exceeds an upper limit.

12. The method of claim 7, wherein a timer interrupt is operable to be used by other programs running simultaneously on the computer to call an original function.

13. The method of claim 12, further comprising:

reading an address of the original function from an interrupt table, wherein the interrupt table contains one or more addresses of service routines associated with one or more interrupt inputs; and replacing the address of the original function by the address of the start function in the interrupt table.

14. The method of claim 12, wherein one or more of the target function and the original function are operable to be executed by an interrupt request by means of the start function.

15. The method of claim 12, wherein the timer is operable to be adjusted to a clock rate by the operating system, and wherein the timer is operable to be set to a maximum clock rate prior to said repeatedly reading.

16. The method of claim 15, wherein the clock rate of the timer is changed and reset to the maximum clock rate prior to said executing the start function.

17. The method of claim 12, further comprising:

upon triggering the first interrupt signal, creating one or more of a list of one or more predetermined times for the execution of the target function and a list of one or more times for triggering of the first interrupt signal;

wherein the start function compares a next time of the execution of the target function with a time of a next interrupt signal and operates to cause execution of the original function if the next interrupt signal appears at least a maximum delay before a next time of execution of the target function.

18. The method of claim 12, further comprising:

upon triggering the first interrupt signal, creating one or more of a list of one or more predetermined times for the execution of the target function and a list of one or more times for execution of the original function;

wherein the start function compares a next time of the execution of the target function with a time of a next time of execution of the original function and operates to cause execution of the original function if the next time of execution of the original function appears at least a maximum delay before a next time of execution of the target function.

19. The method of claim 12, further comprising:

activating the original function, wherein said activating the original function comprises activating the original function by using a jump command by means of the start function.

20. The method of claim 1, further comprising:

changing value of the register by the start function;

wherein said changing value of the register comprises pushing the register contents onto a computer stack at a beginning of the start function, and wherein the value of the register are written back into the register at an end of the start function.

21. The method of claim 1, further comprising:

determining a currently executed interrupt by reading a register of an interrupt controller at a beginning of the start function; and acknowledging processing of the current interrupt request by an end-of-interrupt command (EOI) after said determining the currently executed interrupt.

22. The method of claim 1, further comprising:

the start function determining existence of an additional interrupt signal at the first interrupt input;

wherein the start function is operable to send an error to the target function if said determining the existence of the additional interrupt signal is true.

23. The method of claim 1, further comprising:

loading a software program into memory of the computer, wherein the software program is executable to perform said executing the start function, said repeatedly reading the computer register, said compareing the read value with a reference value, and said calling the target function.

24. A machine-readable data carrier with a software program stored on the data carrier, wherein the software program implements a method for the scheduled execution of a target function the software program being executable by a processor to:

execute a start function, wherein the start function is executed by the processor as an interrupt service routine;

repeatedly read a computer register to obtain a read value, wherein said repeatedly reading comprises the start function repeatedly reading the computer register;

compare the read value with a reference value, wherein the reference value corresponds to a predetermined time; and execute the target function in the processor when the read value corresponds to the reference value, wherein said executing is performed in response to the start function calling the target function when the read value corresponds to the reference value.

25. The machine-readable data carrier of claim 24, wherein said comparing the read value comprises the start function repeatedly comparing the read value.

26. The machine-readable data carrier of claim 24, wherein the interrupt signal is triggered by a timer, wherein the timer is programmed with the reference value by the start function.

27. The machine-readable data carrier of claim 24, wherein the interrupt signal is triggered with a lead time before the predetermined time;

wherein the lead time is greater than an expected maximum delay between appearance of the interrupt signal at the interrupt input of the processor and said executing the start function.

28. The machine-readable data carrier of claim 24, wherein the computer register comprises a count register.

29. The machine-readable data carrier of claim 28, wherein the count register comprises a time stamp counter of the processor.

30. The machine-readable data carrier of claim 24, wherein the interrupt signal is triggered by a computer timer as a timer interrupt.

31. The machine-readable data carrier of claim 24, wherein an expected maximum delay is determined continuously.

32. The machine-readable data carrier of claim 31, wherein the computer register comprises a count register; and wherein the value for the expected maximum delay is determined by using an actual delay, wherein the actual delay is determined by reading the count register at the beginning of the start function and by subtracting the value representing time of appearance of the interrupt signal.

33. The machine-readable data carrier of claim 32, wherein the expected maximum delay is determined by multiplying the actual delay by a safety factor.

34. The machine-readable data carrier of claim 33, wherein the software program further comprises the steps to:

set value of a lead time substantially equal to the expected maximum delay when the expected maximum delay exceeds an upper limit.

35. The machine-readable data carrier of claim 32, wherein the software program further comprises the steps to:

generate an error report when the expected maximum delay exceeds an upper limit.

36. The machine-readable data carrier of claim 31, wherein a timer interrupt is operable to be used by other programs running simultaneously on the computer to call an original function.

37. The machine-readable data carrier of claim 36, wherein the software program is further executable by the processor to:

read an address of the original function from an interrupt table, wherein the interrupt table contains one or more addresses of service routines associated with various interrupt inputs; and replace the address of the original function by the address of the start function in the interrupt table.

38. The machine-readable data carrier of claim 36, wherein one or more of the target function and the original function are operable to be executed by an interrupt request by means of the start function.

39. The machine-readable data carrier of claim 36, wherein the timer is operable to be adjusted to a clock rate by the operating system, and wherein the timer is operable to be set to a maximum clock rate prior to said repeatedly reading.

40. The machine-readable data carrier of claim 39, wherein the clock rate of the timer is changed and reset to the maximum clock rate prior to said executing the start function.

41. The machine-readable data carrier of claim 36, wherein the software program is further executable by the processor to:

upon triggering the interrupt signal, create one or more of a list of one or more predetermined times for the execution of the target function and a list of one or more times for triggering of the interrupt signal;

wherein the start function compares a next time of the execution of the target function with a time of a next interrupt signal and operates to cause execution of the original function if the next interrupt signal appears at least a maximum delay before a next time of execution of the target function.

42. The machine-readable data carrier of claim 36, wherein the software program further comprises the steps to:

activate the original function, wherein said activating the original function comprises activating the original function by using a jump command by means of the start function.

43. The machine-readable data carrier of claim 24, wherein the software program further comprises the steps to:

change value of the register by the start function;

wherein said changing value of the register comprises pushing the register contents onto a computer stack at a beginning of the start function, and wherein the value of the register are written back into the register at an end of the start function.

44. The machine-readable data carrier of claim 24, wherein the software program further comprises the steps to:

determine a currently executed interrupt by reading a register of an interrupt controller at a beginning of the start function; and acknowledge processing of the current interrupt request by an end-of-interrupt command (EOI) after said determining the currently executed interrupt.

45. The machine-readable data carrier of claim 24, wherein the software program further comprises the steps to:

determine exsistence of an additional interrupt signal at the interrupt input by the start function;

wherein the start function is operable to send an error report to the target function if said determining the exsistence of the additional interrupt signal is true.

* * * * *

UNITED STATES PATENT AND TRADEMARK OFFICE

CERTIFICATE OF CORRECTION

PATENT NO. : 6,934,783 B2 
DATED : August 23, 2005
INVENTOR(S) : Müller et al.

It is certified that error appears in the above-identified patent and that said Letters Patent is hereby corrected as shown below:

Column 10,
Line 65, please delete "compareing" and substitute -- comparing --.

Column 12,
Line 65, please delete "exsistence" and substitute -- existence --.

Signed and Sealed this

Thirteenth Day of December, 2005

JON W. DUDAS
*Director of the United States Patent and Trademark Office*